United States Patent
Ramamurthy et al.

(10) Patent No.: US 9,668,184 B1
(45) Date of Patent: May 30, 2017

(54) MANAGING CALLS BASED ON RESOURCE ALLOCATION

(71) Applicant: Sprint Spectrum L.P., Overland Park, KS (US)

(72) Inventors: Suryanarayanan Ramamurthy, Olathe, KS (US); Rajat Kumar, Kansas City, MO (US); Talat Jamshidi, Leawood, KS (US); Jay D. Cole, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 664 days.

(21) Appl. No.: 14/163,485

(22) Filed: Jan. 24, 2014

(51) Int. Cl.
*H04W 72/00* (2009.01)
*H04W 36/16* (2009.01)
*H04W 36/00* (2009.01)

(52) U.S. Cl.
CPC ........ *H04W 36/16* (2013.01); *H04W 36/0022* (2013.01)

(58) Field of Classification Search
CPC .................................................. H04W 36/0022
USPC .................. 455/423–425, 436–438, 445, 453
See application file for complete search history.

(56) References Cited

U.S. PATENT DOCUMENTS

| | | | |
|---|---|---|---|
| 6,061,559 A | 5/2000 | Eriksson et al. | |
| 6,889,048 B1 | 5/2005 | Koo | |
| 7,206,593 B1 | 4/2007 | Yarkosky et al. | |
| 2010/0284272 A1* | 11/2010 | Wang | H04W 28/24 370/230 |
| 2011/0039564 A1* | 2/2011 | Johnstone | H04W 36/22 455/436 |
| 2011/0305240 A1* | 12/2011 | Chu | H04L 47/10 370/391 |
| 2013/0322277 A1* | 12/2013 | Vanganuru | H04W 24/08 370/252 |
| 2014/0162661 A1* | 6/2014 | Shaw | H04W 36/22 455/439 |

\* cited by examiner

*Primary Examiner* — Charles Appiah
*Assistant Examiner* — Jaime Holliday

(57) ABSTRACT

To help manage resources in a cellular wireless communication system, a base station may track air interface resource allocation for each UE the base station is serving with a call and may identify one or more of the UEs or calls as candidates for handover from the base station on grounds that air interface resource allocation to each of the identified one or more UEs is high. Upon receipt of a request from a UE to initiate a new call, the base station may then predict based at least on that UE's channel quality what the air interface resource allocation rate will be for the requested call. And if the predicted rate for the given UE is threshold low, the base station may select one of the candidate UEs and force a handover of the selected UE's call from the base station.

17 Claims, 4 Drawing Sheets

MANAGING CALLS BASED ON RESOURCE ALLOCATION

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover between coverage areas, and functions related to air interface communication.

In accordance with the air interface protocol, each coverage area may operate on one or more carrier frequencies or ranges of carrier frequencies In a frequency division duplex (FDD) arrangement, different carrier frequencies or ranges are used for the downlink than the uplink. Whereas, in a time division duplex (TDD) arrangement, the same carrier frequency or range is used for the downlink and uplink and is allocated over time among downlink and uplink communications.

Further, each coverage area may define a number of subsidiary air interface channels for carrying information between the base station and the UEs. These channels may be defined in various ways, such as through frequency division multiplexing, time division multiplexing, and/or code-division multiplexing, for instance. By way of example, each coverage area may define one or more downlink control channels and one or more downlink shared channels having resources that the base station may allocate on an as-needed basis to carry downlink communications to UEs, and each coverage area may provide a downlink reference signal that UEs can detect and measure as a basis to determine downlink channel quality. Further, each coverage area may define one or more uplink control channels and one or more uplink shared channels having resources that the base station may allocate on an as-needed basis to carry uplink communications from UEs, and each UE may provide an uplink reference signal that the base station may measure as a basis to determine a UE's uplink channel quality.

When a UE first powers on or enters into a base station's coverage area, the UE may "attach" with the base station, by transmitting an attach request to the base station. The attach request may cause the base station or associated infrastructure to authenticate and authorize the UE for service by the base station and to reserve network resources for use to serve the UE. In particular, the attach request may result in setup of one or more virtual bearer connections extending in the network between the base station and one or more transport networks and extending over the air interface as a radio link between the base station and the UE. Each such bearer may have a particular service level and intended use. For instance, one such bearer may be a default bearer for use to carry general data communications to and from the UE. Whereas, another such bearer may be a signaling bearer for use to carry packet-based session setup signaling such as Session Initiation Protocol (SIP) signaling between the UE and a network communication server, and another such bearer may be a dedicated bearer that provides a guaranteed minimum bit rate for carrying real-time media communications for instance.

Once the UE is attached with a base station, the UE may operate in a connected mode or an idle mode. In the connected mode, the UE may engage in communication of bearer data (e.g., application layer communications, such as SIP signaling, voice communication, video communication, file transfer, gaming communication, or the like), transmitting bearer data on uplink traffic channel resources to the base station and receiving bearer on downlink traffic channel resources from the base station.

Further, in the connected mode under some air interface protocols, the base station may manage scheduling of air interface resources (e.g., uplink and downlink shared channels) for use to carry communications wirelessly between the base station and the UE. For instance, each time the UE has data to transmit, the UE may send a scheduling request to the base station, and the base station may responsively signal to the UE to direct the UE to use certain uplink resources for the transmission. And each time the base station has data to transmit to the UE, the base station may similarly signal to the UE to direct the UE to receive the transmission on certain downlink resources. Alternatively, for certain types of communications, such as voice calls for example, the base station and UE may use a semi-persistent scheduling process in which certain periodic air interface resources are reserved for use to carry bearer data between the base station and the UE, without the need for the base station and UE to repeatedly exchange scheduling related signaling.

After a timeout period of no bearer data communication between the base station and the UE (possibly with respect to a particular bearer), or for other reasons, the UE may transition from the connected mode to the idle mode, with the base station releasing the radio link portion of one or more bearer connections assigned to the UE, so as to conserve air interface resources. In the idle mode, the UE may then simply monitor a downlink control channel to receive overhead information and to check for any page messages for the UE. Further, the UE may then engage in signaling with the base station to transition back to the connected mode if and when the UE receives a page message from the base station indicating an inbound bearer communication or if and when the UE seeks to engage in outbound bearer communication.

One increasingly important type of communication in cellular wireless networks is voice over Internet Protocol (VoIP) communication. In particular, as cellular wireless networks and associated UEs advance to support high quality IP based communication, wireless service providers that once provided voice telephony service using traditional PSTN connections will likely transition to support VoIP telephony service. To facilitate VoIP telephony service, a wireless service provider may make use of an Internet Multimedia Service (IMS) platform or the like, with which a served UE may engage in SIP signaling to set up VoIP communication, and through which the UE may then engage in VoIP communication to exchange voice with various remote telephony devices.

Overview

As a general matter, a wireless service provider may wish to have each of its wireless coverage areas support as many concurrent VoIP calls as possible, so as to provide voice telephony service concurrently to as many UEs as possible. One issue with achieving this goal, however, is that UEs having poor wireless channel quality (e.g., UEs that are located at the far edge of their serving coverage area, are in an obstructed area, and/or have limited transceiver capabilities) may consume a disproportionately large share of air interface resources when engaged in VoIP communication, leaving less air interface capacity for the network to use for serving other UEs with VoIP calls.

To appreciate this issue, consider that each coverage area of a wireless network has a limited extent of air interface resources, such as a limited number of shared channel resources per unit time. Further, a wireless network may be configured to provide at least a minimum "guaranteed" data rate for every VoIP call that the network handles, to help ensure that users experience an expected high level of voice call quality. When a UE has relatively good channel quality, it may be possible for the network to allocate a relatively small quantity of air interface resources to represent each unit of data being communicated over the air interface between the UE and the base station. But when a UE has relatively poor channel quality, it may be necessary to allocate a much greater quantity of air interface resources to represent each unit of data being communicated over the air interface. Consequently, it may take a greater extent of air interface resources to serve a UE with a VoIP call if the UE has poor channel quality than if the UE has good channel quality.

Given the desire to support many concurrent VoIP calls in a coverage area, it may therefore be useful to limit the extent to which a base station provides VoIP call connectivity for UEs having poor channel quality, so as to help free up air interface resources to allow the base station to provide VoIP call connectivity for a potentially greater number of UEs having good channel quality. Disclosed herein is a method and apparatus to help accomplish this.

In accordance with the disclosure, a base station or other entity will track air interface resource allocation for each of various UEs that the base station is serving with a call (e.g., a VoIP call or other type of call for that matter) and will identify one or more of the UEs (or calls) as candidates for handover from the base station on grounds that air interface resource allocation to each of the identified one or more UEs is high (e.g., highest among UEs being served with calls). When the base station then receives a request from a given UE to initiate a new call, the base station may predict based at least on that given UE's channel quality what the air interface resource allocation rate will be for the requested call. And if the predicted rate for the given UE is threshold low, the base station may then responsively select one of the candidate UEs and force a handover of the selected UE's call from the base station, perhaps to another coverage area or to another network altogether.

Accordingly, in one respect, disclosed is a method for managing service of UEs by a base station that serves UEs over an air interface defining a continuum of resource units allocable by the base station for use by the UEs (e.g., for use to carry bearer communication to and/or from the UEs). In accordance with the method, the base station determines, respectively for each of a plurality of UEs each currently engaged in a call served by the base station, a rate at which the resource units are allocated to the UE. Further, of the plurality of UEs each currently engaged in a call served by the base station, the base station identifies one or more of the UEs based at least on the determined rate of resource unit allocation to each identified UE being high. Still further, the base station receives a request from a UE to initiate a new call, and, responsive to the request, the base station predicts, based at least on air interface quality between the base station and the UE, a rate at which the resource units will be allocated to the UE. In response to the predicted rate being threshold low, the base station then selects one of the identified UEs and forces a handover from the base station of the call in which the selected UE is currently engaged.

In another respect, disclosed is a method of managing voice over Long Term Evolution (VoLTE) call connections served by a base station that is configured to serve each VoLTE call at a predefined minimum bit rate and that provides an LTE air interface defining a continuum of resource blocks allocable by the base station. In accordance with the method, while the base station is serving a number of VoLTE calls, the base station determines for each VoLTE call a rate at which the resource blocks are allocated for the VoLTE call. Further, of the number of VoLTE calls being served by the base station, the base station identifies one or more of the VoLTE calls based at least on the determined rate of resource block allocation for each identified VoLTE call being high. Still further, the base station receives a request from a UE to initiate a new VoLTE call, and, responsive to the request, the base station predicts, based at least on air interface quality between the base station and the UE, a rate at which the resource blocks will be allocated to the UE for the new VoLTE call. In response to the predicted rate being threshold low, the base station then selects one of the identified VoLTE calls and forces a handover of the selected VoLTE call from being served by the base station.

And in yet another aspect, disclosed is a base station operable to carry out functions such as these. The base station includes an antenna structure for engaging in air interface communication with UEs served by the base station over an air interface that defines a continuum of allocable resource blocks. Further, the base station includes a controller that is configured to manage serving of UEs by the base station. In line with the discussion above, the controller is configured to (i) determine respectively for each UE currently engaged in a VoIP call served by the base station a rate at which the resource blocks are assigned to the UE, (ii) identify one or more of the UEs having highest determined rate of resource block allocation, (iii) detect a request from a UE to initiate a new VoIP call, (iv) predict, based at least on air interface quality between the base station and the UE, a rate of resource block allocation for the new call, and (v) responsive to the predicted rate being threshold low, select one of the identified one or more UEs and force handover of the VoIP call of each selected UE from being served by the base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will now be described by way of example in the context of LTE communication and in particular with respect to VoLTE communication. It should be understood, however, that principles of this disclosure can extend to other air interface protocols as well, with variations where appropriate. Further, even within the context of LTE communication, numerous variations from the specific arrangements and processes described are possible. For instance, various described machines, connections, functions, and other elements may be added, omitted, distributed, re-located, combined, or changed in other ways.

Figure 1:
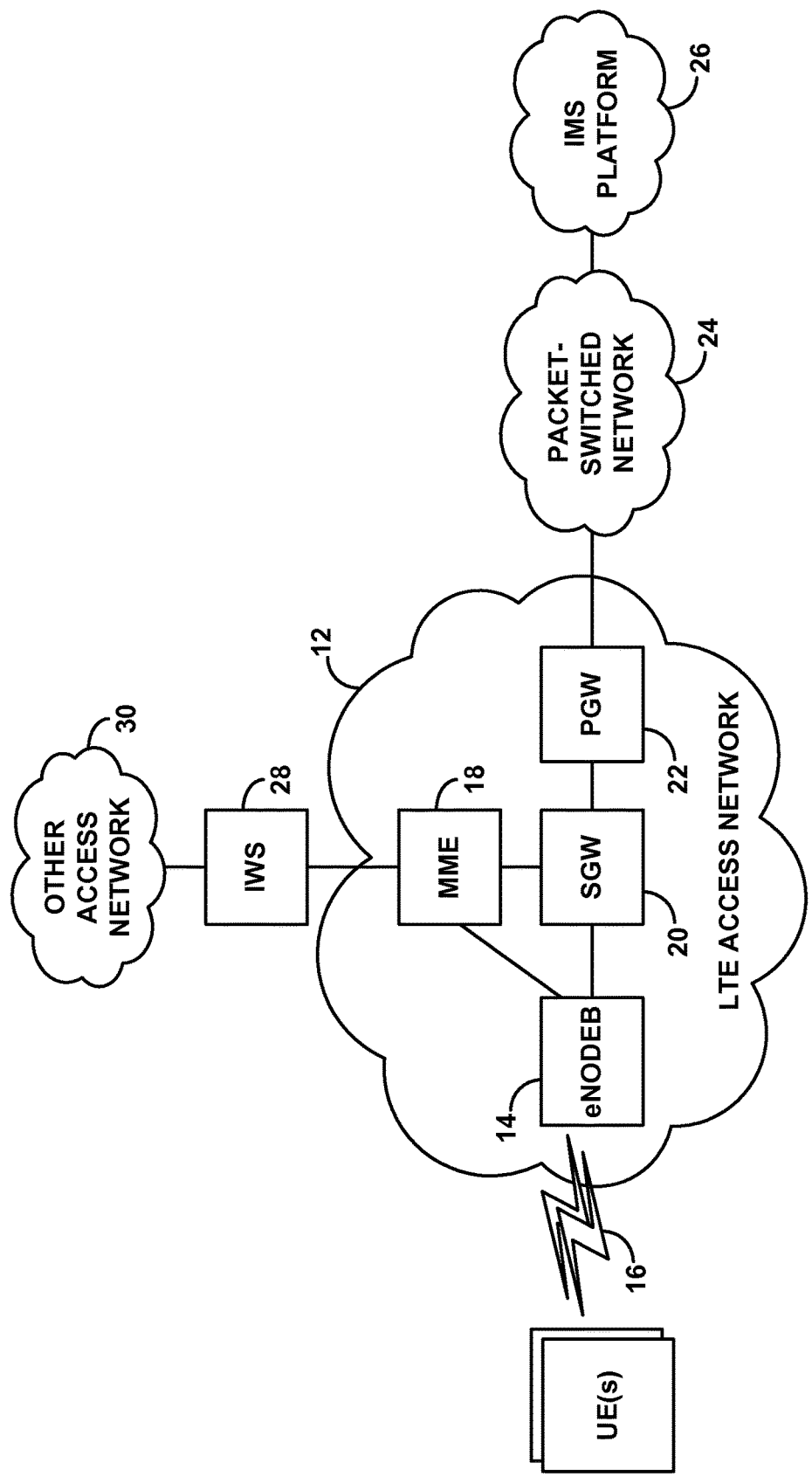
FIG. 1 is a simplified block diagram of a network arrangement in which an exemplary embodiment of the present method and apparatus can be implemented.

The arrangement of FIG. 1 includes by way of example a representative LTE access network 12 including an LTE base station known as an eNodeB 14, which radiates to provide one or more wireless coverage areas 16 in which UEs may operate. As shown, the eNodeB is then coupled with core LTE network infrastructure, including a mobility management entity (MME) 18, a serving gateway (SGW) 20, and a packet-data network gateway (PGW) 22 providing connectivity with a packet-switched network 24 such as the Internet. Shown accessible on the packet-switched network is then an IMS platform 26 that may function to support VoIP call service as noted above. Further, shown in the figure is an interworking server (IWS) 28 that facilitates signaling between the LTE network and another access network 30 such as a CDMA or GSM network for instance.

In accordance with a recent version of LTE, the air interface on both the downlink and the uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond time segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus each supporting transmission of 12 orthogonal frequency division multiplex (OFDM) symbols in respective "resource elements." Thus, the eNodeB and a served UE may transmit symbols to each other in these resource elements, particularly on subcarriers that are spaced apart from each other by 15 kHz and in time segments spanning 67 μs each.

The LTE air interface may then define various channels made up of certain ones of these resource blocks and resource elements. For instance, on the downlink, certain resource elements across the bandwidth may be reserved to define a physical downlink control channel (PDCCH), and other resource elements may be reserved to define a physical downlink shared channel (PDSCH) that the eNodeB can allocate on an as-needed basis to carry transmissions to particular UEs, with still other resource elements being reserved to define a downlink reference signal. Likewise, on the uplink, certain resource elements across the bandwidth may be reserved to define a physical uplink control channel (PUCCH), and other resource elements may be reserved to define a physical uplink shared channel (PUSCH) that the eNodeB can allocate on an as-needed basis to carry transmissions from particular UEs.

Depending on the bandwidth of the coverage area, the air interface will thus have a particular limited extent of resources (resource units, such as resource blocks and resource elements) that the eNodeB can allocate per unit time, such as per subframe. In practice, the eNodeB may manage this allocation in accordance with the type of communication in which the UE is engaged and in accordance with the UE's channel quality. As noted above, for instance, the eNodeB may be configured to guarantee a particular minimum data rate for VoLTE calls, and the eNodeB and UE may use a particular air interface coding rate selected based on the UE's channel quality.

In particular, the UE and eNodeB may be dynamically set to use a particular modulation and coding scheme (MCS) selected based on the UE's channel quality, with each MCS supporting a corresponding data rate. For instance, when the UE's channel quality is poor, the eNodeB and UE may use a low-order MCS such as Quadrature Phase Shift Keying (QPSK), in which each symbol represents just 2 coded data bits. Whereas, if the UE's channel quality is medium, the eNodeB and UE may use a mid-order MCS such as 16 Quadrature Amplitude Modulation (16QAM), in which each symbol represents 4 coded data bits. And if the UE's channel quality is high, the eNodeB and UE may use a high-order MCS such as 64QAM, in which each symbol represents 6 coded data bits. Further gradations of MCS and coding rate are possible as well.

In practice, a UE may from time to time determine its channel quality based on downlink air interface quality (e.g., downlink reference signal strength) and one or more other factors (e.g., UE's capabilities) and transmit to the eNodeB a channel quality indicator (CQI) indicating the UE's determined channel quality. Using a standard CQI-MCS mapping table that maps CQI to MCS, the eNodeB may then determine from the reported CQI what MCS to use for communication with the UE, and the eNodeB may allocate air interface resources accordingly. Alternatively or additionally, the eNodeB may from time to time evaluate uplink air interface quality (e.g., uplink reference signal strength) as a basis to determine the UE's channel quality, and the eNodeB may similarly select an appropriate MCS for air interface communication with the UE. For VoLTE calls having a minimum guaranteed bit rate, the eNodeB may thus need to allocate to a UE a particular number of resource blocks per unit time based on the number of bits the chosen MCS will represent per resource element.

In practice, when serving a UE with a VoLTE call connection, an eNodeB may allocate resources to the UE in this manner on a per subframe basis or the like, periodically directing the UE to use particular resource blocks of the PUSCH and PDSCH in an upcoming subframe. Or the eNodeB may apply semi-persistent scheduling by directing the UE to use particular resource blocks on an ongoing basis in periodically recurring subframes. Dynamically changing this resource allocation over time as the UE's channel quality changes, the eNodeB may thereby continue to support VoLTE communication with the desired level of quality.

As noted above, the present disclosure provides for managing service of UEs based on evaluation and prediction of resource use, to help maximize the number of concurrently served VoLTE calls for instance. In an example implementation, an eNodeB may do this (i) by identifying one or more existing VoLTE calls for possible handover on grounds that each identified VoLTE call has been receiving a high level of resource allocation, and (ii) upon receipt of a request from a UE to establish a new VoLTE call, predicting based at least on the UE's air interface quality that the new VoLTE call would have a relatively low level of resource allocation, and responsively selecting and forcing handover from the eNodeB of one of the identified candidate VoLTE calls, to help free up resources to serve more VoLTE calls.

In this process, the function of identifying one or more existing VoLTE calls for possible handover could be done on an ongoing basis as a background process at the eNodeB or could be done in response to receiving the request to establish the new VoLTE call. Further, this function may also be considered to involve selecting one or more UEs each currently engaged in a VoLTE call, for possible handover of the UEs from the eNodeB.

This function assumes to start that the eNodeB has knowledge of which UEs served by the eNodeB are engaged in VoLTE calls. In practice, the eNodeB may gain this knowledge as UEs acquire bearers specifically for use to carry voice communication (e.g., with a corresponding quality of service control indicator communicated from the UE to the eNodeB or from core network infrastructure to the eNodeB). The eNodeB may maintain this information in individual context records per UE and/or in a rolled up data table listing UEs currently engaged in VoLTE calls. Further, as UEs finish their VoLTE calls and the associated bearers are released, the eNodeB may update this data accordingly.

For each UE currently engaged in a VoLTE call, or for each such VoLTE call, the eNodeB may then further maintain a record of the extent of resources the eNodeB has allocated for the VoLTE call. For instance, as the eNodeB allocates resource blocks over time (on the downlink and/or uplink) for a UE's VoLTE call, the eNodeB may keep a record of the rate of such allocation, such as what percentage of all allocable resource blocks per subframe the eNodeB has been allocating to the UE for the VoLTE call, on average or otherwise measured. The eNodeB may thus update this record as the VoLTE call progresses and as eNodeB allocates resources to the UE for the VoLTE call.

To identify one or more existing VoLTE calls, or UEs currently each engaged in a VoLTE call, for possible handover from the eNodeB, the eNodeB may then rank the VoLTE calls or UEs in order of resource allocation per call or per UE, ranking highest the call or UE that has received the highest rate of resource allocation and ranking lowest the call or UE that has received the lowest rate of resource allocation. The eNodeB may then select one or more candidate VoLTE calls or UEs from that rank order by selecting the highest ranked (e.g., top ranked) calls or UEs.

The function of receiving the request from a UE to establish a new VoLTE call may then involve receiving from the UE an attach request or connection request corresponding with a VoLTE call. For example, the UE may have an IMS signaling bearer in the idle mode and may send a connection request to transition that bearer to a connected mode, and the eNodeB may interpret that request to correspond with a VoLTE call or the like (for that matter any real-time media communication that could be considered similar to a VoLTE call). And as another example, the UE may engage in SIP signaling over an IMS signaling bearer to set up a VoLTE call and may send to the eNodeB a connection request to transition a dedicated VoIP bearer from idle mode to connected mode so as to engage in the VoLTE call, and the eNodeB may likewise consider that request to correspond with a VoLTE call or the like.

To predict a rate at which the eNodeB will allocate resource blocks to the UE for the new VoLTE call, the eNodeB may then consider one or more measures of air interface quality between the eNodeB and the UE, taking into account the minimum bit rate for a VoLTE call and the MCS coding rate that would correspond with the UE's channel quality for instance. For example, if the UE has been in the connected mode using a default bearer or the like, the eNodeB may have received from the UE measurement reports specifying CQI as determined by the UE, which would be based at least on downlink air interface quality (e.g., downlink reference signal strength) as determined by the UE, and/or the eNodeB may have determined uplink air interface quality (e.g., uplink references signal strength) for the UE. Based on such indications of channel quality, the eNodeB may then apply a standard QCI-MCS mapping to determine what the applicable MCS would likely be for communication with the UE. And given that MCS and the minimum VoLTE bit rate, the eNodeB may compute a rate of resource block allocation that will likely be necessary for serving the UE with the new VoLTE call.

Put another way, the eNodeB may determine air interface quality between the eNodeB and the UE, and the eNodeB may then determine, based at least on that determined air interface quality, a supportable bit-rate per resource unit, considering a corresponding MCS and associated coding rate for instance. The eNodeB may then predict a rate at which resources will be allocated to the UE, based at least on (i) the determined supportable bit-rate per resource unit and (ii) a predefined bit rate for the new call, such as the minimum bit rate per VoLTE call.

In accordance with the present disclosure, the eNodeB may then determine that the predicted rate of resource allocation for the new VoLTE call would be threshold low, such as lower than some predefined percentage of resource blocks per subframe for instance. And in response to determining that the predicated rate would be threshold low, the eNodeB may then select one of the identified candidate existing VoLTE calls or UEs each currently engaged in VoLTE calls, for handover from the eNodeB. Here, the eNodeB may select each of the identified candidate UEs or VoLTE calls, on grounds that they were deemed to have relatively high resource usage, or the eNodeB may select the one or more with the highest such usage.

The eNodeB may then force a handover of each such selected VoLTE call or UE from the eNodeB in various ways. By way of example, the eNodeB may signal to the UE at issue to transition to be served on a different frequency channel, by a physically separate eNodeB, and/or by a different access network altogether. As a specific example, the eNodeB may trigger a single radio voice call continuity (SRVCC) handover of each such call to another access network, such as to access network 30 for instance. To do so, the eNodeB may signal to the MME, which may then signal to the IWS to set up transition of the call over to access network 30 and may further trigger signaling to the IMS platform to cause the existing voice call to be bridged to access network 30. The UE may then transition to network 30 and continue the call bridged through the IMS platform. Other arrangements for handover are possible as well.

In practice, an eNodeB may carry out this process generally in response to the eNodeB determining that some predetermined threshold extent of upcoming resources are reserved. For example, if the eNodeB is currently serving a number of VoLTE calls with semi-persistent scheduling set for the calls, the eNodeB may thereby have a record of the extent to which resources in upcoming subframes or frames are reserved. If that extent is greater than a defined threshold, the eNodeB may then responsively carry out this process, to help manage service or UEs.

Figure 2:
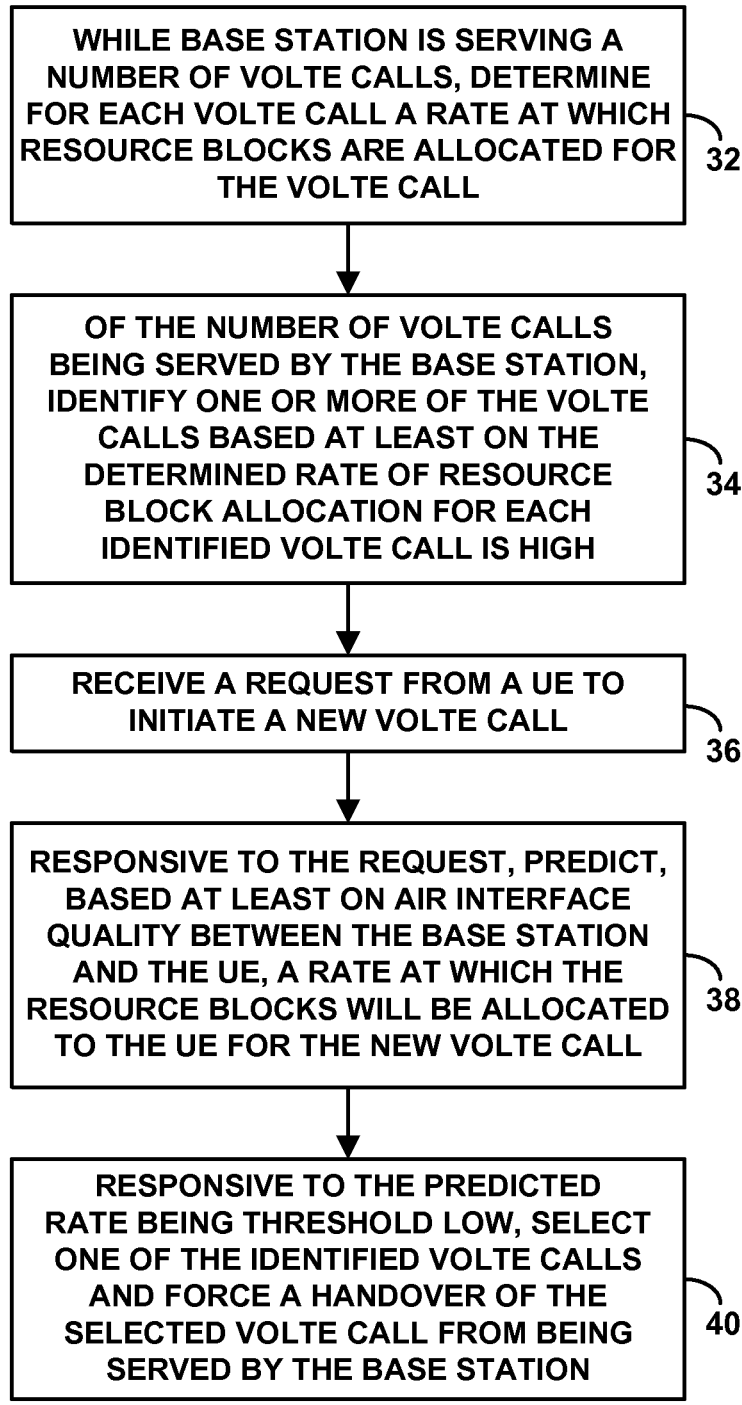
FIG. 2 is a flow chart depicting functions that can be carried out in accordance with an example implementation of the method.

FIG. 2 is next a flow chart depicting some of these functions, specifically in the context of LTE and VoLTE communication. In particular, FIG. 2 depicts a method of managing VoLTE call connections served by a base station, where the base station is configured to serve each VoLTE call at a predefined minimum bit rate, and wherein the base station provides an LTE air interface defining a continuum of resource blocks allocable by the base station.

As shown in FIG. 2, at block 32, while the base station is serving a number of VoLTE calls, the method involves determining for each VoLTE call a rate at which the resource blocks are allocated for the VoLTE call. At block 34, the method then further involves, of the number of VoLTE calls being served by the base station, identifying one or more of the VoLTE calls based at least on the determined rate of resource block allocation for each identified VoLTE call being high. At block 36, the method then further involves the base station receiving a request from a UE to initiate a new VoLTE call. And at block 38, the method involves, responsive to the request, the base station predicating, based at least on air interface quality between the base station and the UE, a rate at which the resource blocks will be allocated to the UE for the new VoLTE call. At block 40, the method then involves, responsive to the predicted rate being threshold low, selecting one of the identified VoLTE calls and forcing a handover of the selected VoLTE call from being served by the base station.

Figure 3:
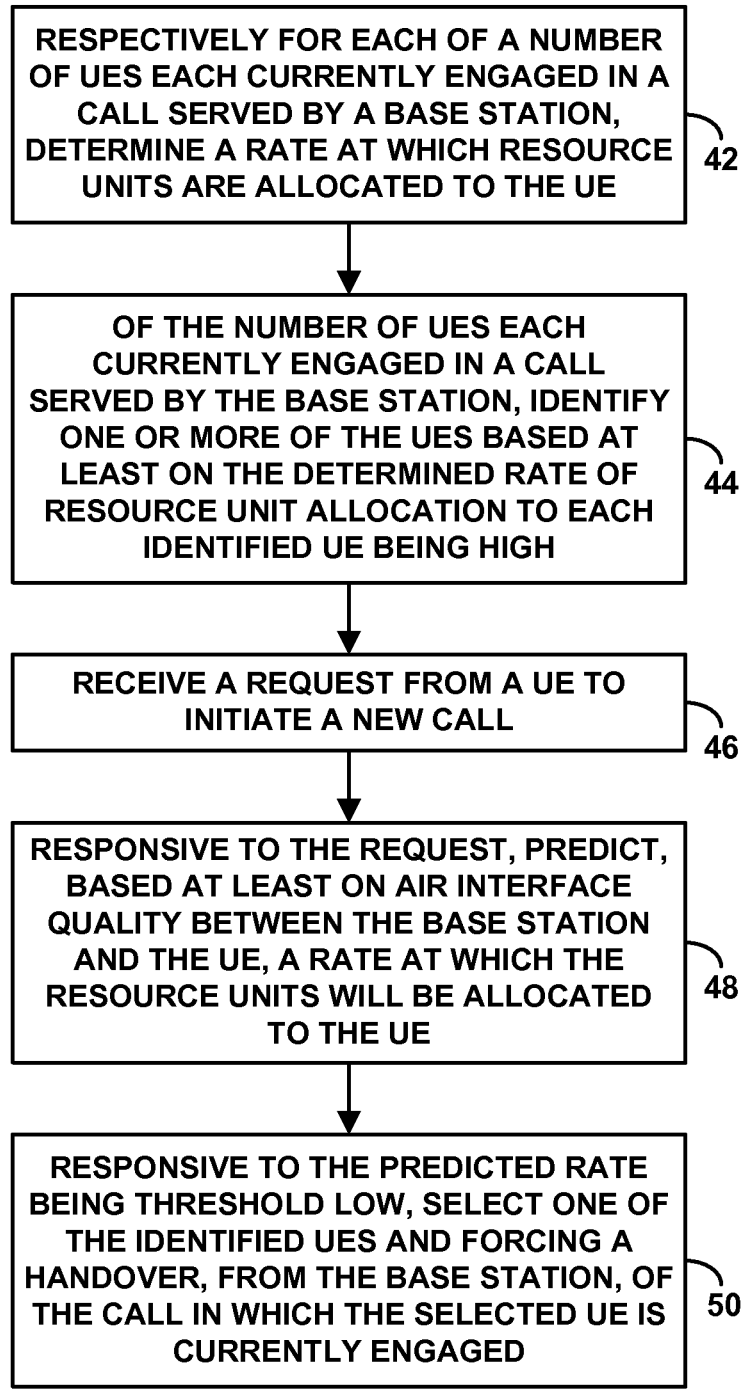
FIG. 3 is another flow chart depicting functions that can be carried out in accordance with an example implementation of the method.

As noted above, these functions need not be limited to LTE or to VoLTE calls. Thus, in the discussion above, reference to resources may relate to any resource units, not necessarily limited to LTE resource blocks or the like. Further, reference to a VoLTE call could relate to any call, not necessarily limited to VoLTE, and perhaps extending to any real-time media communication, whether voice, video, or the like. FIG. 3 is next a flow chart depicting some of these functions more generally, as a method for managing service of UEs by a base station, where the base station serves UEs over an air interface defining a continuum of resource units allocable by the base station for use by the UEs.

As shown in FIG. 3, at block 42, the method involves, respectively for each of a number of UEs each currently engaged in a call served by the base station, determining a rate at which the resource units are allocated to the UE. At block 44, the method further involves, of the number of UEs each currently engaged in a call served by the base station, identifying one or more of the UEs based at least on the determined rate of resource unit allocation to each identified UE being high. At block 46, the method then further involves the base station receiving a request from a UE to initiate a new call. And at block 48, the method involves, responsive to the request, predicting, based at least on air interface quality between the base station and the UE, a rate at which the resource units will be allocated to the UE. At block 50, the method then involves, responsive to the predicted rate being threshold low, selecting one of the identified UEs and forcing a handover, from the base station, of the call in which the selected UE is currently engaged.

Figure 4:
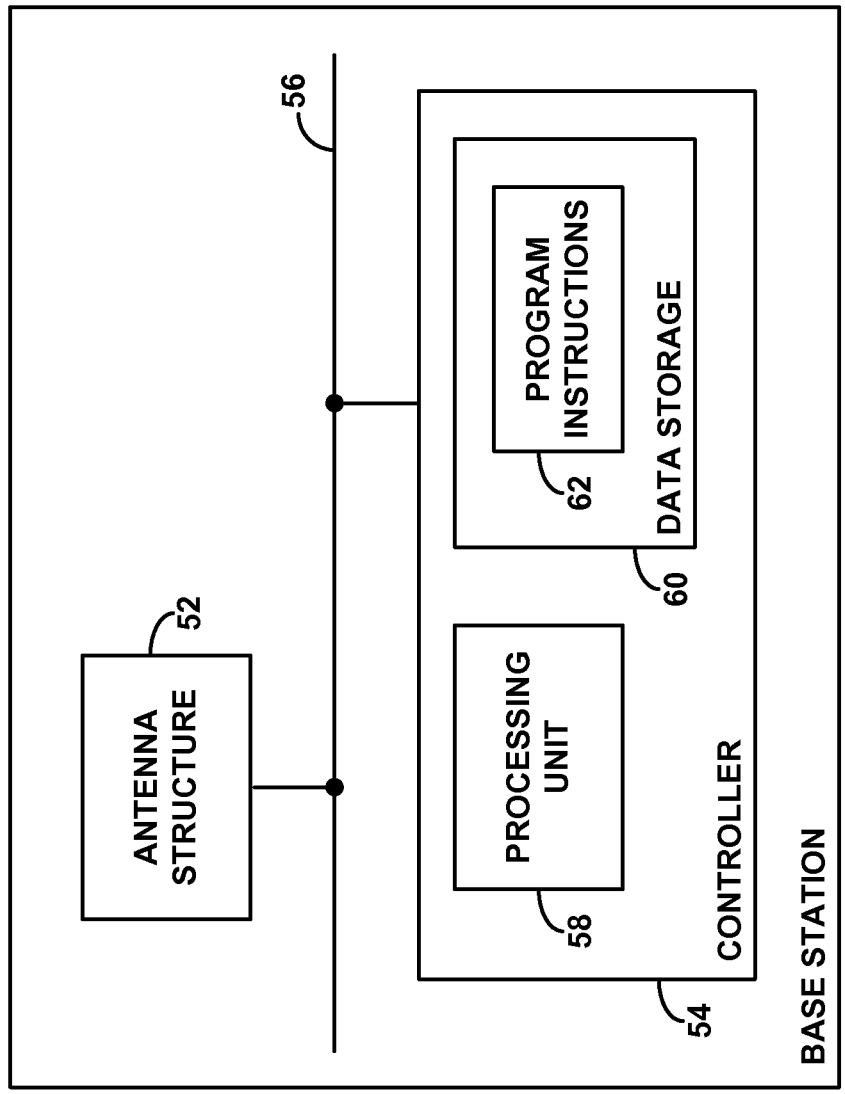
FIG. 4 is a simplified block diagram of an example base station operable in accordance with the present disclosure.

Finally, FIG. 4 is a simplified block diagram of an example base station, showing components that the base station may include in an example implementation. This base station may take various forms such as, for instance, a "macro base station" of the type implemented in public spaces typically including a cell tower and tower top antenna structure, or a "small cell", "femtocell", or the like, of the type that typically has a smaller form factor and is designed to provide smaller coverage and perhaps to operate in a smaller area such as in a home or office.

As shown in FIG. 4, the example base station includes an antenna structure 52 for engaging in air interface communication with UEs served by the base station over an air interface defining a continuum of allocable resource blocks. Further, the base station includes a controller 54 that is arranged to manage or carry out various functions such as those discussed above. For example, the controller may function to (i) determine respectively for each UE currently engaged in a VoIP call served by the base station a rate at which the resource blocks are assigned to the UE, (ii) identify one or more of the UEs having highest determined rate of resource block allocation, (iii) detect a request from a UE to initiate a new VoIP call, (iv) predict, based at least on air interface quality between the base station and the UE, a rate of resource block allocation for the new call, and (v) responsive to the predicted rate being threshold low, select one of the identified one or more UEs and force handover of the VoIP call of each selected UE from being served by the base station.

As shown, these components of the base station may be communicatively linked together by a system bus, network, or other connection mechanism 56. Alternatively, they may be integrated together in various ways. Further, as shown, the controller 54 may include a processing unit 58 (e.g., one or more general purposes processors and/or special-purpose processors), data storage 60 (e.g., one or more volatile or non-volatile storage components, such as magnetic, optical, or flash storage), and program instructions 62 stored in the data storage and executable by the processing unit to carry out the various controller functions.

Exemplary embodiments have been described above. Those skilled in the art will understand, however, that changes and modifications may be made to these embodiments without departing from the true scope and spirit of the invention.

We claim:

1. A method for managing service of user equipment devices (UEs) by a base station, wherein the base station serves UEs over an air interface defining a continuum of resource units allocable by the base station for use by the UEs, the method comprising:

respectively for each of a number of UEs each currently engaged in a call served by the base station, determining a rate at which the resource units are allocated to the UE;

of the number of UEs each currently engaged in a call served by the base station, identifying one or more of the UEs based at least on the determined rate of resource unit allocation to each identified UE being highest of the number of UEs each engaged in a call served by the base station;

receiving into the base station a request from a UE to initiate a new call, and, responsive to the request, predicting, based at least on air interface quality between the base station and the UE, a rate at which the resource units will be allocated to the UE, wherein predicting, based at least on air interface quality between the base station and the UE, the rate at which the resource units will be allocated to the UE comprises (a) determining air interface quality between the base station and the UE, (b) determining, based at least on the determined air interface quality, a supportable bit-rate per resource unit, and (c) determining the predicted rate based at least on (i) the determined supportable bit-rate per resource unit and (ii) a predefined bit rate for the new call; and responsive to the predicted rate being lower than a predefined threshold rate, selecting one of the identified UEs and forcing a handover, from the base station, of the call in which the selected UE is currently engaged.

2. The method of claim 1, wherein each call in which each UE of the number of UEs is engaged is a voice over Internet Protocol (VoIP) call.

3. The method of claim 2, wherein the air interface is a Long Term Evolution (LTE) air interface, and wherein each VoIP call is a voice over LTE (VoLTE) call.

4. The method of claim 3, wherein the resource units are orthogonal frequency division multiplex (OFDM) resource blocks.

5. The method of claim 3, wherein forcing a handover of the call from the base station comprises triggering single radio voice call continuity (SRVCC) to hand over the call.

6. The method of claim 5, wherein triggering SRVCC to hand over the call results in handover of the call from an LTE network to a network selected from the group consisting of a Code Division Multiple Access (CDMA) network and a Global System for Mobile Communications (GSM) network.

7. The method of claim 1, carried out in response to determining that a predefined threshold upcoming extent of the resource units is reserved.

8. The method of claim 1, wherein identifying one or more of the UEs based at least on the determined rate of resource unit allocation to each identified UE being highest of the number of UEs each engaged in a call served by the base station comprises:

ranking the UEs in order of determined rate of resource unit allocation per UE, to produce a rank order of the UEs; and identifying the one or more UEs as one or more UEs having highest determined rate of resource unit allocation in the rank order.

9. The method of claim 1, wherein receiving the request from the UE to initiate the call comprises receiving from the UE a request that corresponds with a call.

10. The method of claim 1, wherein determining the air interface quality between the base station and the UE comprises at least one function selected from the group consisting of:

determining strength of an uplink reference signal transmitted to the base station from the UE, and receiving from the UE a measurement report specifying strength of a downlink reference signal transmitted from the base station to the UE.

11. A method of managing voice over Long Term Evolution (VoLTE) call connections served by a base station, wherein the base station is configured to serve each VoLTE call at a predefined minimum bit rate, and wherein the base station provides a Long Term Evolution (LTE) air interface defining a continuum of resource blocks allocable by the base station, the method comprising:

while the base station is serving a number of VoLTE calls, determining for each VoLTE call a rate at which the resource blocks are allocated for the VoLTE call;

of the number of VoLTE calls being served by the base station, identifying one or more of the VoLTE calls based at least on the determined rate of resource block allocation for each identified VoLTE call being highest of the number of VoLTE calls served by the base station;

receiving into the base station a request from a user equipment device (UE) to initiate a new VoLTE call, and, responsive to the request, predicting by the base station, based at least on air interface quality between the base station and the UE, a rate at which the resource blocks will be allocated to the UE for the new VoLTE call, wherein predicting, based at least on air interface quality between the base station and the UE, the rate at which the resource blocks will be allocated to the UE for the new VoLTE call comprises (a) determining air interface quality between the base station and the UE, (b) determining, based at least on the determined air interface quality, a supportable bit-rate per resource block, and (c) determining the predicted rate based at least on (i) the determined supportable bit-rate per resource block and (ii) the predefined minimum bit rate at which the base station is configured to serve each VoLTE call; and responsive to the predicted rate being lower than a predefined threshold, selecting one of the identified VoLTE calls and forcing a handover of the selected VoLTE call from being served by the base station.

12. The method of claim 11, wherein each VoLTE call being served by base station is a VoLTE call in which a respective UE served by the base station is currently engaged, and wherein identifying each VoLTE call of the one or more VoLTE calls comprises identifying the UE currently engaging in the VoLTE call.

13. The method of claim 11, wherein identifying the one or more VoLTE calls based at least on the determined rate of resource block allocation for each identified VoLTE call being highest of the number of VoLTE calls served by the base station comprises:

ranking the VoLTE calls, in order of resource block allocation, the plurality of VoLTE calls currently served by the base station, to produce a rank ordering of the VoLTE calls; and identifying as the one or more VoLTE calls one or more top ranked VoLTE calls according to the rank ordering.

14. The method of claim 11, wherein forcing a handover of the selected VoLTE call from being served by the base station comprises triggering single radio voice call continuity (SRVCC) handover of the call from being a VoLTE call served by the base station to being a voice call served by another radio access network.

15. The method of claim 14, wherein the other radio access network comprises a network selected from the group consisting of a Code Division Multiple Access (CDMA) network and a Global System for Mobile Communications (GSM) network.

16. A base station comprising:
an antenna structure for engaging in air interface communication with user equipment devices (UEs) served by the base station over an air interface defining a continuum of allocable resource blocks; and
a controller configured to manage serving of UEs by the base station, wherein the controller is configured to (i) determine respectively for each UE currently engaged in a voice over Internet Protocol (VoIP) call served by the base station a rate at which the resource blocks are assigned to the UE, (ii) identify one or more of the UEs having highest determined rate of resource block allocation, (iii) detect a request from a UE to initiate a new VoIP call, (iv) predict, based at least on air interface quality between the base station and the UE, a rate of resource block allocation for the new call, and (v) responsive to the predicted rate being lower than a predefined threshold, select one of the identified one or more UEs and force handover of the VoIP call of each selected UE from being served by the base station,
wherein predicting, based at least on air interface quality between the base station and the UE, the rate of resource block allocation for the new call comprises (a) determining air interface quality between the base station and the UE, (b) determining, based at least on the determined air interface quality, a supportable bit-rate per resource block, and (c) determining the predicted rate based at least on (i) the determined supportable bit-rate per resource block and (ii) a predefined minimum bit rate for the new call.

17. The base station of claim 16, wherein the predefined minimum bit rate for the new call is a predefined minimum bit rate at which the base station is configured to serve each VoIP call.

* * * * *